United States Patent
Jaquith et al.

(10) Patent No.: US 6,549,941 B1
(45) Date of Patent: Apr. 15, 2003

(54) SOFTWARE SYSTEM AND METHODS FOR RESUBMITTING FORM DATA TO RELATED WEB SITES

(75) Inventors: Tracey Jaquith, San Francisco, CA (US); Seth Morris, San Francisco, CA (US)

(73) Assignee: Alexa Internet, San Francisco, CA (US)

( * ) Notice: Subject to any disclaimer, the term of this patent is extended or adjusted under 35 U.S.C. 154(b) by 0 days.

(21) Appl. No.: 09/447,392

(22) Filed: Nov. 22, 1999

(Under 37 CFR 1.47)

(51) Int. Cl.[7] .................. G06F 17/30; G06F 17/00; G06F 17/21
(52) U.S. Cl. .................. 709/219; 705/26; 707/3; 709/203; 709/217; 709/232
(58) Field of Search ................ 709/200, 219, 709/217, 203, 225; 705/10

(56) References Cited

U.S. PATENT DOCUMENTS

| | | | | |
|---|---|---|---|---|
| 5,913,215 A | * | 6/1999 | Rubinstein et al. | 707/10 |
| 5,963,952 A | * | 10/1999 | Smith | 707/102 |
| 6,006,225 A | * | 12/1999 | Bowman et al. | 707/5 |
| 6,199,079 B1 | * | 3/2001 | Gupta et al. | 707/507 |
| 6,208,988 B1 | * | 3/2001 | Schultz | 707/5 |
| 6,266,649 B1 | * | 7/2001 | Linden et al. | 705/26 |
| 6,282,548 B1 | * | 8/2001 | Burner | 707/104 |
| 6,292,796 B1 | * | 9/2001 | Drucker et al. | 707/5 |
| 6,297,819 B1 | * | 10/2001 | Furst | 345/329 |
| 6,317,722 B1 | * | 11/2001 | Jacobi et al. | 705/14 |
| 6,411,950 B1 | * | 6/2002 | Moricz et al. | 707/3 |

OTHER PUBLICATIONS http://ww.usenix.org/publications/login/1998–5/lalonde.html.*
P. Festa, New Internet Explorer tested, dated Nov. 4, 1998.
P. Festa, IE 5 sneak peek shows new content features, dated Mar. 16, 1999.
Entering Web Information more easily, printed date Feb. 10, 2000.
Finding the information you want, printed date Feb. 10, 2000.

* cited by examiner

*Primary Examiner*—David Wiley
*Assistant Examiner*—Alina Boutah
(74) *Attorney, Agent, or Firm*—Knobbe, Martens, Olson & Bear LLP

(57) ABSTRACT

A client program executes in conjunction with a web browser on a user computer. The client program captures submitted form data from HTTP requests and presents the user with the option of resubmitting the form data to related web sites based upon information transmitted to the client program from a metadata server. A processing engine, located in the client program or on the metadata server, extracts the submitted data from an HTTP request and creates data resubmission blocks using the extracted data. The data resubmission blocks replace related forms on related web sites but incorporate the extracted data. Instructions based upon which the processing engine extracts the data and creates data resubmission blocks are stored on the metadata server. The data resubmission blocks are displayed to the user through the web browser and can be submitted by the user without the need to re-enter data, in order to resubmit the extracted data to the related web sites. In a preferred embodiment, the system is used to capture a query submitted to a search engine of one web site, and to present the user an option to submit the same query to the search engines of one or more related web sites. When the user conducts a search of a merchant's web site, the related web sites may be those of merchants that carry the same or similar products.

16 Claims, 9 Drawing Sheets

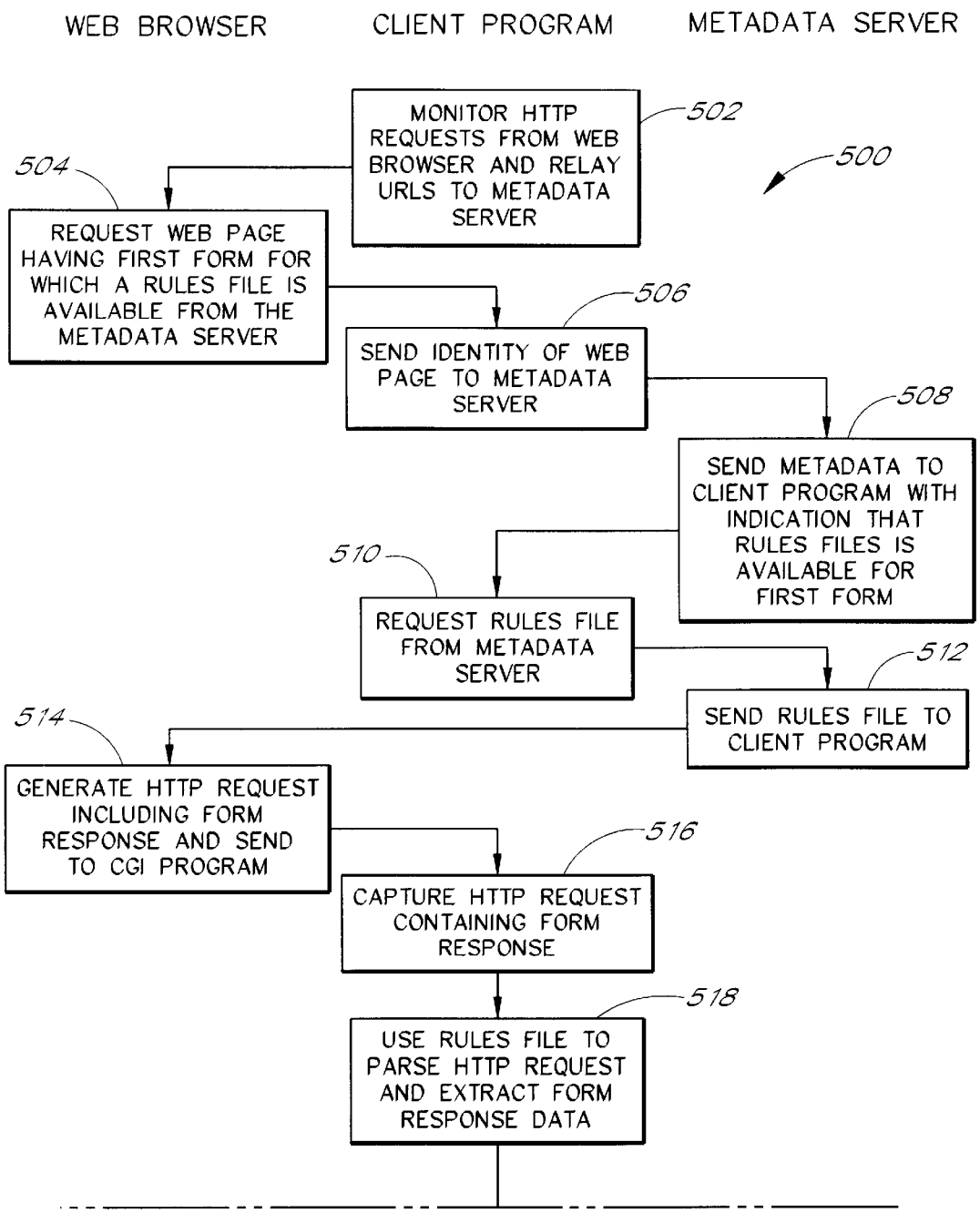

SOFTWARE SYSTEM AND METHODS FOR RESUBMITTING FORM DATA TO RELATED WEB SITES

BACKGROUND OF THE INVENTION

1. Field of the Invention

This invention relates generally to the submission of search queries and other types of form data to World Wide Web sites, and more particularly, to facilitating the resubmission of previously submitted form data to related web sites.

2. Description of the Related Art

The Internet has become a convenient and popular medium for the exchange of information and the transacting of commerce. An Internet user has access to a vast number of web sites on the World Wide Web and this number is increasing at a rapid pace. It is frequently becoming the case that for any one web site, there exist numerous related web sites that offer the same or similar products, services, or information.

In many cases, in order to provide a response to the user, a number of related web sites also request the same or similar information through the use of forms. For example, Internet search engines such as AltaVista, Infoseek, and HotBot each request a search query from a user in order to process a search. The user submits an HTML form containing data, such as a query, to a first of the related web sites and the web site returns a results page. It may be the case that, after receiving the results page, the user is not satisfied with the results provided by the first web site and would like to re-submit the data, e.g. the query, to a related web site.

In order to submit the same query or other data to a related web site, the user typically has to take at least three steps. First, the user has to locate a related web site, and in some cases, a page of that site that contains a corresponding form. If the user does not have the appropriate related web page bookmarked, this step may additionally involve going to a search engine to find the related web site. Second, the user has to reenter into the form the data already submitted to the first web site. The user may have to remember or write down the originally submitted data or use a cut & paste operation re-enter the data. Finally, the user submits the related form and receives another results page.

SUMMARY OF THE INVENTION

The present invention provides a client program that operates in conjunction with a metadata server to capture form data submitted to a web site, and to resubmit the form data to one or more related web sites. The client program runs on a user computer in conjunction with or as a native component of a web browser. In a preferred embodiment, the system allows users to resubmit search queries to search engines of related web sites.

One specific application of the invention involves resubmitting a product-related query to the search engines of related merchant web sites. For example, when a user submits a query to the eToys web site, the user may be presented the option to submit the same query to the Toys-R-Us web site. The identities of the related web sites, and/or the types of searches performed on such web sites, may optionally be dependent upon the category (e.g., books, toys, auctions, etc.) of the initial search performed by the user.

In a preferred embodiment, the client program accesses the metadata server to retrieve metadata (related links, etc.) for the web site and/or web page currently being viewed, and displays some or all of the metadata in a special browser frame or window. When the user accesses a search page for which one or more related searches have been defined by the metadata server, the client program also retrieves from the metadata server a set of rules for extracting the query from an HTTP request (Get or Post method). Alternatively, the client program may obtain the query by direct interaction with the web browser. The client program also retrieves instructions for formulating HTTP requests for submitting then query to each of a set of identified related web sites. In one embodiment, the user is presented one or more links (one for each related search) that can be selected to initiate the related search. In another embodiment, the user is also presented an option to modify the query before initiating a related search. The invention may also be used to extract and resubmit other types of form data, such as usernames, passwords, credit card numbers and shipping addresses.

In an alternative, server side embodiment, the tasks of extracting the form data from the HTTP request and formulating the links/HTTP requests for resubmitting such data are performed in-whole or in-part by the metadata server. Another variation involves automatically resubmitting the query or other form data to the related site(s) without first prompting the user.

BRIEF DESCRIPTION OF THE DRAWINGS

Referring now to the drawings in which like reference numbers represent corresponding components throughout:

FIGS. 5A–B illustrate a flowchart of a preferred embodiment of a process by which the web browser, the client program, and the metadata server interact in accordance with a client side embodiment of the present invention.

DETAILED DESCRIPTION OF THE PREFERRED EMBODIMENTS

A system for resubmitting form data to related web sites will now be described with reference to the drawings. Throughout the description, reference will be made to various implementation-specific details of the system. These details are provided in order to fully illustrate a preferred embodiment of the invention, and not to limit the scope of the invention. The scope of the invention is set forth in the appended claims.

I. System Components

Figure 1:
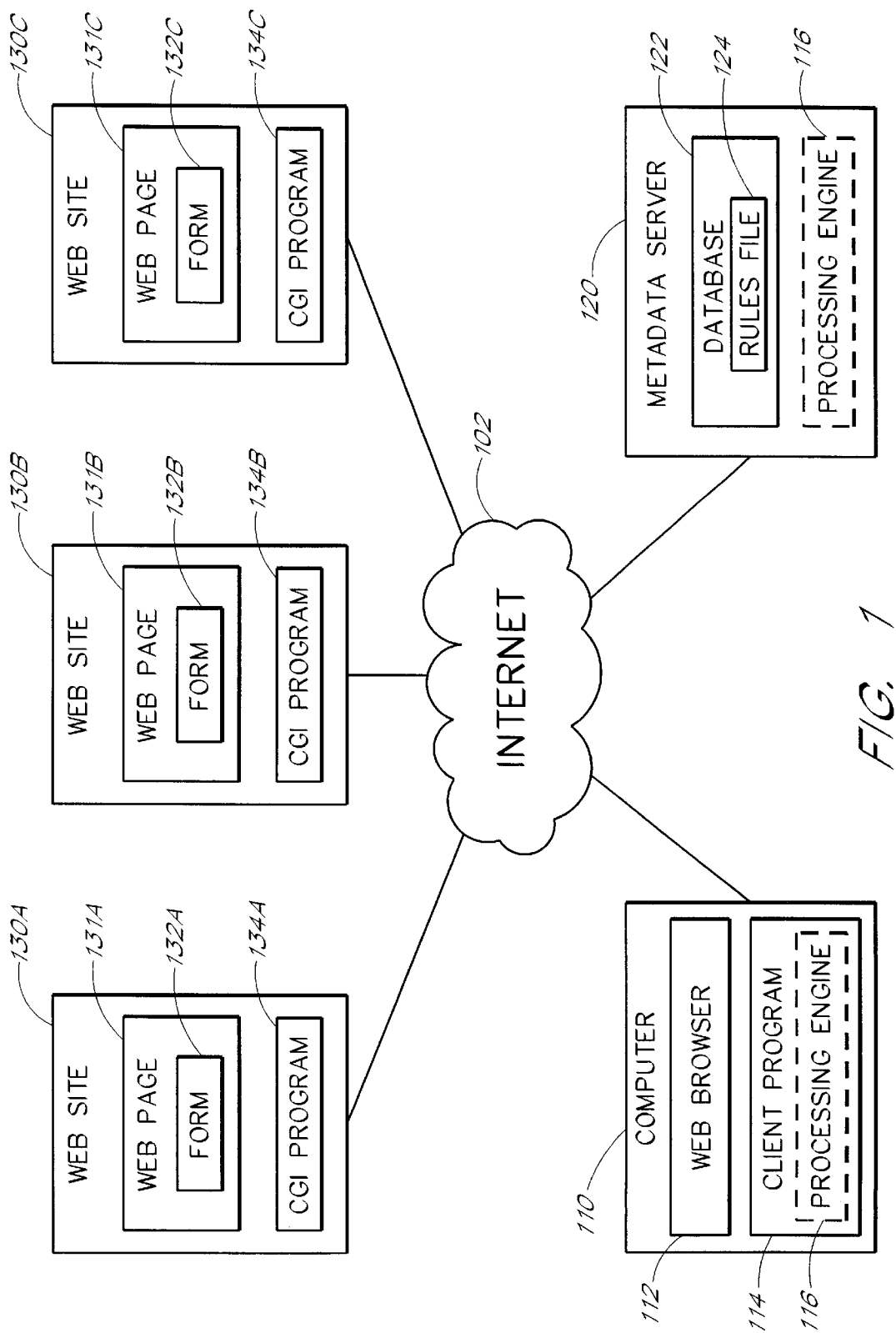
FIG. 1 illustrates the principal components of a preferred embodiment of a system for facilitating the resubmission of queries on related web sites.

FIG. 1 illustrates the principal components of a preferred embodiment of a system for facilitating the resubmission of form data to related web sites. A user computer 110, a metadata server 120, and a plurality of web sites 130A–C communicate through a computer network 102, preferably the Internet. FIG. 1 shows three web sites 130A–C for purposes of illustration, however, any number of web sites 130 may be present. Each web site 130A–C is supported by a web server and comprises a number of web pages and the associated programs and/or scripts necessary to support the web pages. A user accesses the web pages of the web sites 130A–C through a web browser 112 running on the user computer 110.

Figure 2A:
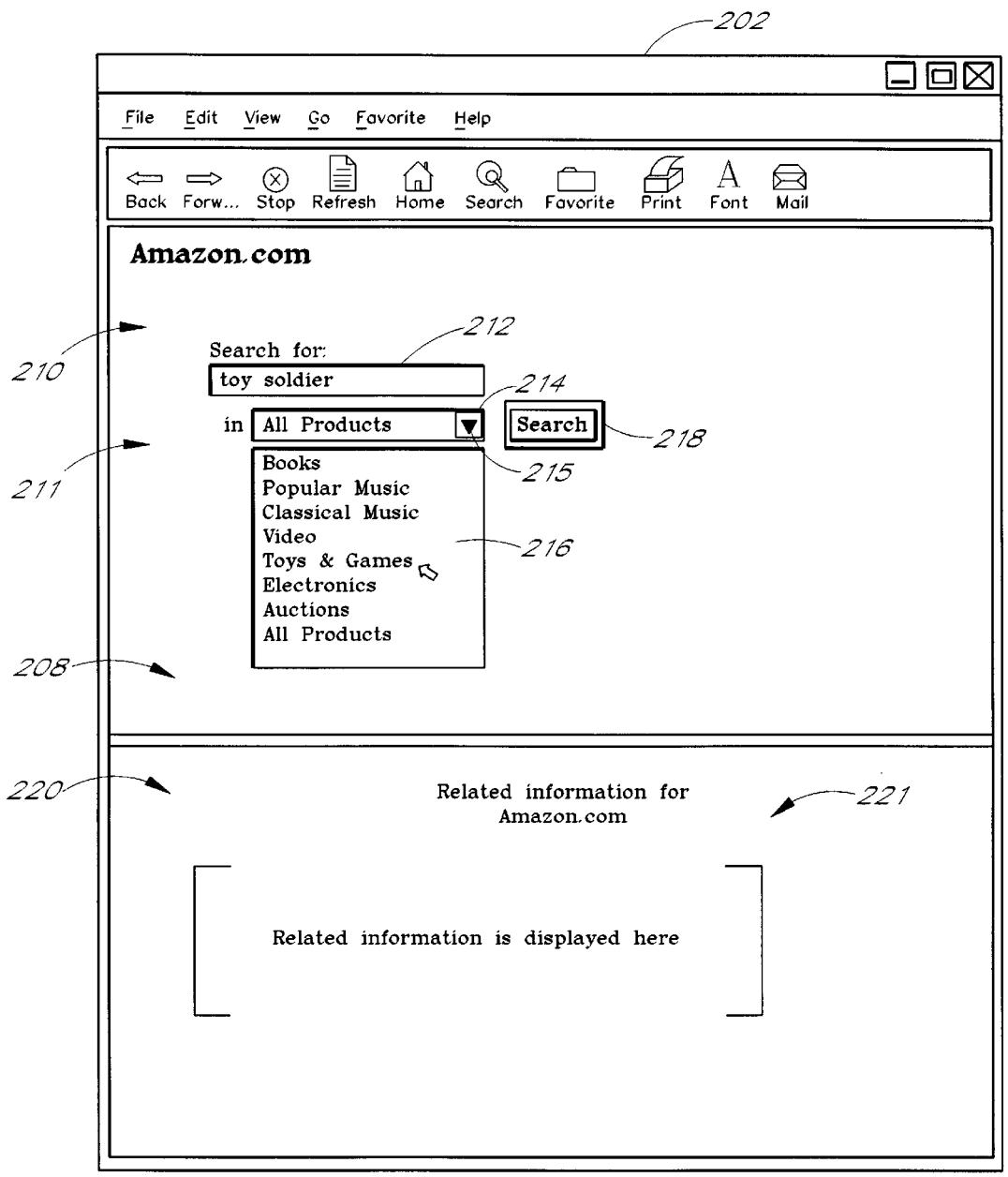
FIGS. 2A–C illustrate a sequence of example web pages that are displayed by a web browser in the system of FIG. 1.
Figure 2B:
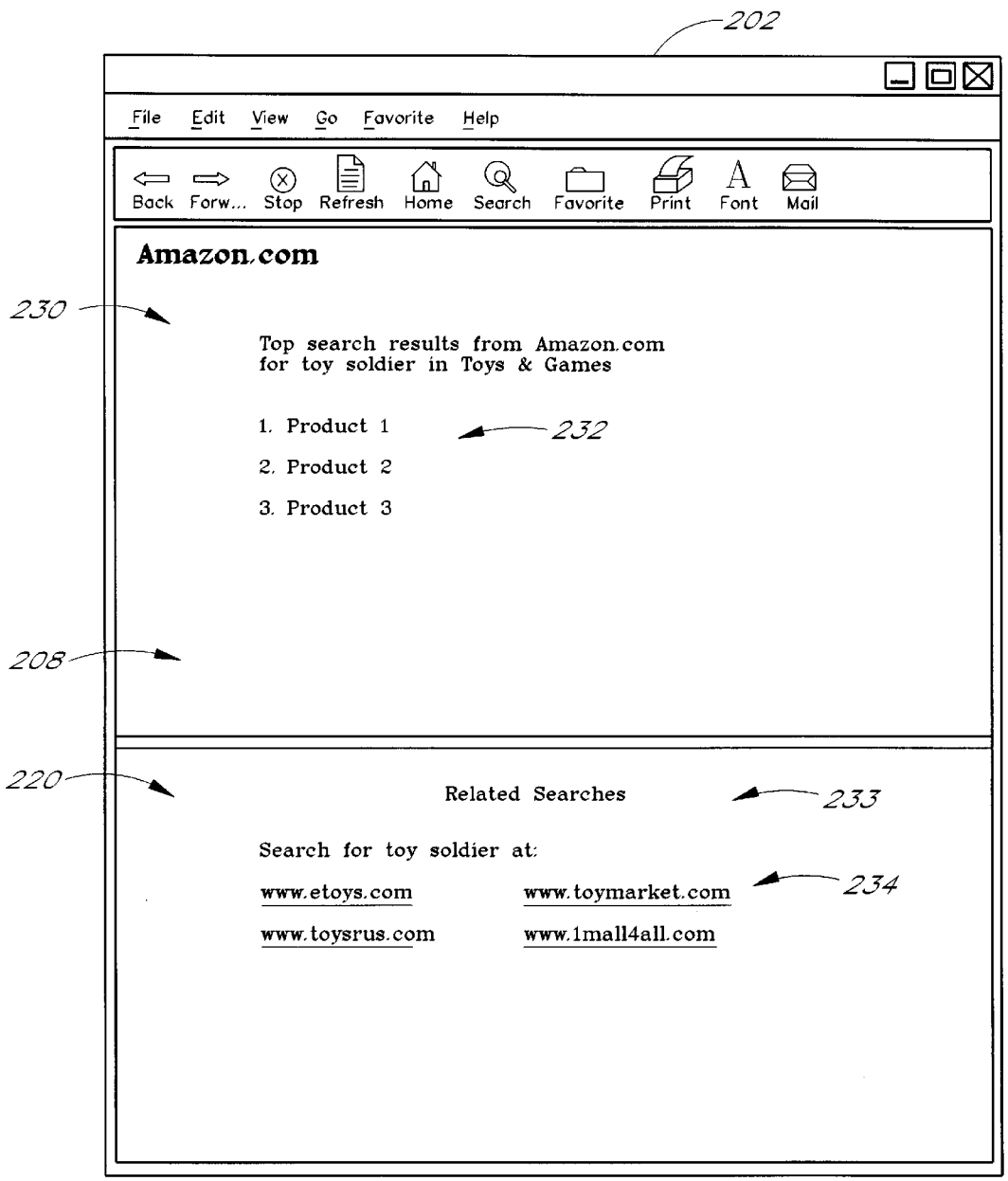

In accordance with the present invention, when the user submits data through a form to a first web site 130A, the user is presented the option of resubmitting the data to one or more related web sites 130B–C (see FIG. 2B). The identities of the related web sites 130B–C, if any, and the information needed to re-submit the data to such sites, is preferably obtained from the metadata server 120. The first web site 130A has a first form 132A located on a first web page 131A. The related web sites 130B–C also have respective related forms 132B–C located on respective related web pages 131B–C. The forms 132A–C are preferably all related to each other in that they all request the same or similar information from the user. The first web site 130A has a first common gateway interface (CGI) program 134A that processes the first form 132A upon submission by a user. The related web sites 130B–C also have respective related CGI programs 134B–C that process the respective related forms 132B–C. The CGI programs 134A–C respond to a form submission by generating and sending a response web page (see FIG. 2B) back to the web browser 112. Although only two related web sites 130C–D are illustrated, any number of related web sites may be present, along with their associated related web pages, forms, and CGI programs.

In the preferred embodiment, the forms 132A–C allow a user to perform a search for a product or a web page. In the case that the web sites 130A–C are those of Internet merchants, the search is preferably for a product on one of the web sites 130A–C. The web sites 130A–C may alternatively be Internet search engine sites, such as, for example, the YAHOO, INFOSEEK, and ALTAVISTA web sites, in which case the search may be for web pages on other web sites (not shown). The forms 132A–C may alternatively allow for the entry of any other kind of information by the user. For example, the forms may request submission of a user ID and a password to gain access to the web sites 130A–C where the web sites 130A–C are all protected by the same user ID—password combination for the user.

A client program 114 runs in conjunction with the web browser 112 on the user computer 110. In a preferred embodiment of the present invention, the client program 114 monitors hypertext transfer protocol (HTTP) traffic between the web browser 112 and any web sites. The client program 114 captures copies of the HTTP requests from the web browser 112 but does not interrupt the transmission of the requests to their destination URLs. The client program 114 is preferably a web browser plug-in program (or equivalently a browser helper object) but may be a standalone program. In an alternative embodiment, the client program 114 is incorporated directly into the web browser 112 itself as a native component.

The client program 114 preferably communicates with the metadata server 120 to provide, in addition to the functionality described herein, metadata (related information) about the web page and/or web site displayed by the web browser 112. A client program that presents metadata to a user, methods for generating metadata, and methods for augmenting a web page with metadata are disclosed in U.S. patent application Ser. No. 08/880,117 filed Jun. 21, 1997, titled METHOD AND APPARATUS FOR AUGMENTING A WEB PAGE WITH METADATA, and No. 09/345,611 filed Jun. 28, 1999, titled SYSTEM AND METHOD FOR GENERATING META-DATA FOR WEB PAGES DOWNLOADABLE OVER A NETWORK SUCH AS THE WORLD WIDE WEB OR THE LIKE, which are assigned to the assignee of the present application and are hereby incorporated by reference. In addition, a commercial embodiment such a client program is available as a free download from the web site of Alexa Internet (www.alexa.com), the assignee of the present application, In a client side embodiment of the present invention, the client program 114 preferably includes a processing engine 116. The processing engine 116 uses a rules file 124 obtained from the metadata server 120 to extract submitted form data from a captured HTTP request. The processing engine 116, also using the rules file 124, preferably creates a data resubmission page that includes options for resubmitting the extracted data to related web sites. The client program 114 preferably displays the data resubmission page to the user in a frame of the web browser 112 (FIG. 2B).

In a server side embodiment, the processing engine 116 is located on the metadata server 120. In this case, the client program 114 preferably sends a captured HTTP request to the metadata server 120 for processing. The metadata server 120 extracts the submitted form data from the captured HTTP request and creates a data resubmission page and returns it to the client program 114 for display to the user.

The metadata server 120 includes a database 122 that preferably stores rules files 124 created in advance. In the alternative, the database. 122 may contain data with which the metadata server 120 can create rules files on-the-fly. As another alternative, the information needed to extract data from an HTTP request and to create a data resubmission page may be stored separately, without a rules file 124.

In an alternative embodiment, the extracted data may be automatically submitted to the related web sites 130B–C without first prompting the user. The results are then preferably displayed to the user instead of the option to resubmit the data.

In still another alternative embodiment, the client program 116 obtains the submitted form data by querying the web browser 112 in order to determine the values of filled in form fields. In accordance with this embodiment, the querying of the web browser 112 replaces the capture of the HTTP request and the extraction of data from the captured request. The values of the form fields can be queried at any time during the user's entry of data into the form fields and possibly after submission of the form. The client program 116 preferably uses rules stored in the rules file 124 to formulate and execute the queries of the web browser 112.

The data resubmission page is preferably a web page formatted in hypertext markup language (HTML) that can be displayed by the web browser 112. In the preferred embodiment, the data resubmission page comprises a number of data resubmission blocks that replace the related forms 132B–C but which already include the extracted data. Each data resubmission block has a destination URL that corresponds to the destination URL of the related form that it replaces. In this manner, each data resubmission block, upon submission by a user, is sent to the same CGI program 134B–C that services the corresponding related form 132B–C.

A data resubmission block can be formatted as an HTML hyperlink (preferably using the HTTP GET method), in which case the extracted data is appended to the end of the destination URL. A data resubmission block can also be formatted as an HTML form (preferably using the HTTP GET or POST methods) having the destination URL as its ACTION. In this case, the extracted data is preferably preloaded into form fields that may or may not be visible to and/or modifiable by the user.

II. Example Web Pages

Figure 2C:
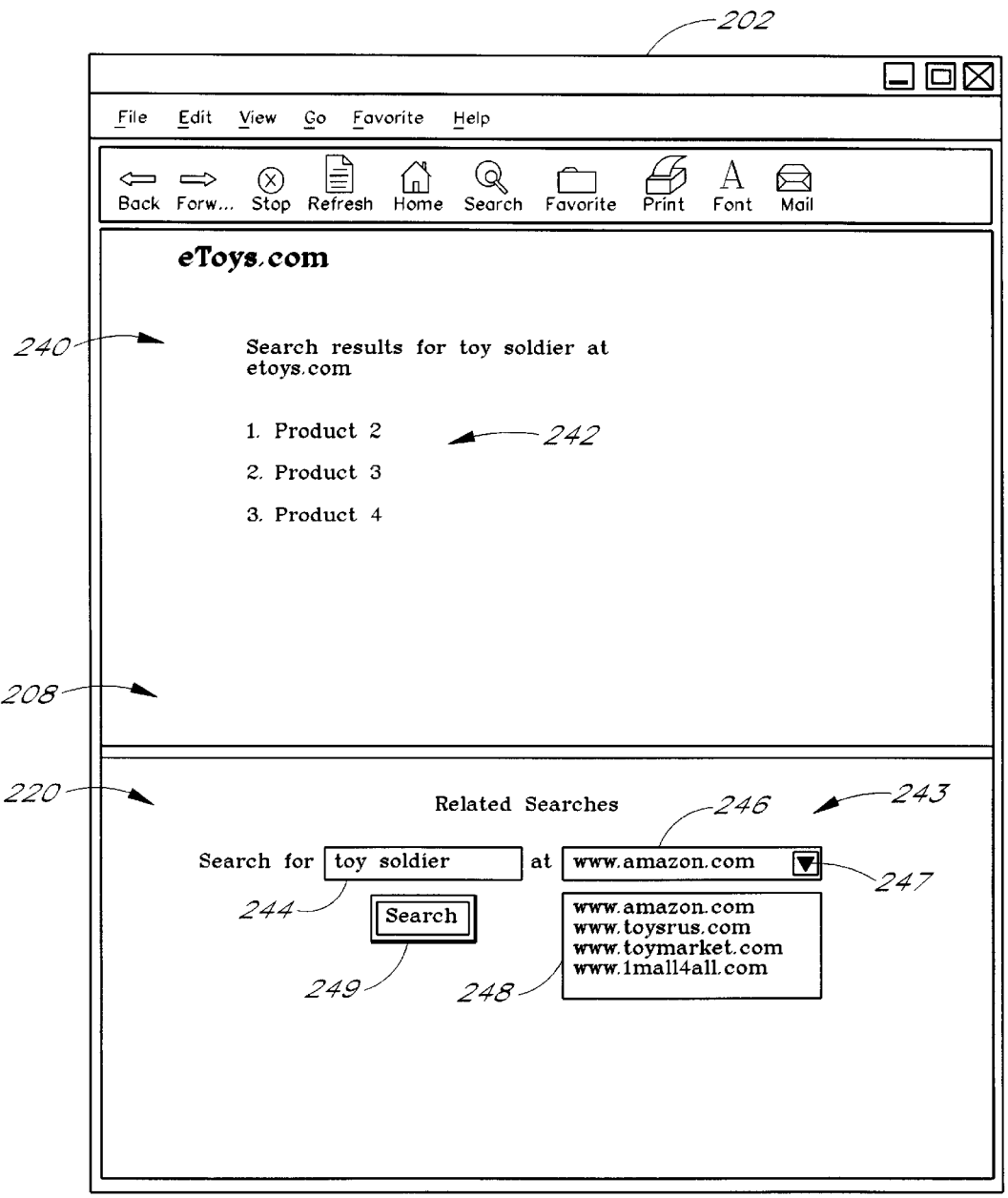

FIGS. 2A–C illustrate a sequence of example web pages that are displayed by the web browser 112 in accordance with a preferred embodiment of the present invention. The web pages in FIGS. 2A–C show an example in which a user performs a search for a "toy soldier" product at an Internet merchant's web site. The client program 114 then presents to the user the option of running the same search on other (related) merchants' web sites without reentering the query.

FIG. 2A illustrates a web browser window 202 displaying a hypothetical product search page 210 at the web site of Amazon.com, an Internet retailer. The product search page 210 is displayed in a first frame 208 of the web browser window 202 and includes a first form 211 that allows the user to enter and submit a search query. The form 211 includes a one line text entry box 212, a category select box 214, and a search button 218. The text entry box 212 allows the user to enter the query terms for the search. The category select box 214 displays a select button 215, which, when clicked, displays a dropdown list 216 of selectable categories in which to search for products. Once the user has entered the query terms and selected the category, the user clicks on the search button 218 to submit the form 211 to its associated CGI program for processing. In the illustrated example, the user chooses to search for "toy soldier" in the "Toys & Games" category.

In a second frame 220 of the web browser window 202, the client program 114 preferably displays a metadata page 221 about the web site and/or web page being accessed in the first frame 202. In the illustrated example, the frame 220 is titled "Related Information for Amazon.com." The metadata or related information may include the postal address of the web site owner, site visitation statistics, site speed, links to related web sites, and other information related to the web site and/or page being browsed.

FIG. 2B illustrates, in the first frame 208 of the web browser 202, a hypothetical query response page 230 provided by the CGI program in response to the form submitted to the Amazon.com web site. The query response page 230 shows the results 232 of the search, which may include a number of products, in the first frame 208 of the browser window 202.

The client program 114 displays a related searches page 233 having options of resubmitting the same search to related web sites in the second frame 220 of the web browser 202. The related searches page 233 is an example of a data resubmission page. The options of resubmitting the search are preferably displayed as hypertext links 234 so that the user can initiate the search with a single mouse-click. Each of the hypertext links 234 is an example of a data resubmission block. The related searches page 233 may optionally include a data resubmission block having a query field, as shown in FIG. 2C below, which allows the user to modify the query. In addition to the related searches page 233, the client program 114 may also display metadata (not illustrated) about the web site being accessed, (e.g. Amazon.com) and/or the web page being viewed.

FIG. 2C illustrates, in the first frame 208, an additional hypothetical query response page 240 that is reached by following the "www.etoys.com" related search link from the data resubmission page 233 of FIG. 2B. The response page 240 is provided by the CGI program of the eToys web site and shows the results 242 of the previous search as run on the eToys site. The page 240 illustrated in FIG. 2C could also have been reached by submitting the search for a "toy soldier" directly to the Etoys.com web site search page.

The second frame 220 of FIG. 2C illustrates an alternative configuration in which the related searches page 243 can present the option of resubmitting a search. In this configuration, the original query is placed in a text box 244 that gives the user the ability to modify the query before submitting it. The user chooses the related web site on which to perform the search in a site select box 246. The site select box 246 displays a select button 247, which, when clicked, displays a dropdown list 248 of related web sites to which the query may be submitted. Once the user has modified the query, if desired, and selected the related web site on which to run the search, the user initiates the search by clicking on the "Search" button 249. Again, another results page (not illustrated) is returned from the selected web site. The related searches page 243 is an additional example of a data resubmission page. The options presented to the user on the related searches page 243 are an example of a data resubmission block.

The client program 114 can also display the option of resubmitting a search in alternative ways. For example, the client program 114 can display the related searches page in a separate window through the web browser 112. Alternatively, the client program 114 can incorporate hyperlinks and/or other elements for initiating the related searches into the results web page 230 displayed in the first frame 208 of the web browser 112. The client program 114 can also display pop up windows in which the related search options can be displayed. In another alternative, the client program 114 can display the data resubmission page to the user separately, without using the web browser 112.

The client program 114 may also include a user configuration option in which the client program 114 automatically submits the search query to competitive related web sites without first presenting the option to the user. In accordance with this option, the client program 114 can also be configured to identify exact matches to the submitted query. In this case, the client program 114 could display a summary page that indicates, for example, whether an exact match was found at each competitive related web site and the respective price of the product in the case of each exact match.

The example web pages illustrated in FIGS. 2A–C are illustrative of only one application of the present invention. In one alternative application, a query is submitted to a web or Internet search engine (e.g., AltaVista.com) instead of the search engine of an Internet merchant. The client program 114 then displays the option to rerun the query on alternate search engines (e.g., Infoseek.com). In another application, the user may submit a user ID and password to gain access to a first web site. The client program 114 can then present to the user the option to log into other web sites using the same user ID and/or password. In general, the present invention can be configured to capture the HTTP request and extract the data submitted in response to any form, and to present the user the option of submitting some or all of the same data to related web sites or sites that request similar information.

In some instances, such as the one illustrated in FIG. 2A, a search can be performed in one or more of a number of different categories. The related searches that are presented to the user in such instances may based upon the search category selected by the user. For example, if a user chooses the "Auction" category of FIG. 2A, the user may be presented with the option to run a related search on eBay.com, an Internet auction site. When, on the other hand, a user chooses the "Music" category, the user may be presented the option to run a related search on Cdnow.com, an Internet music retailer.

III. The Rules File

A. Contents

Figure 3:
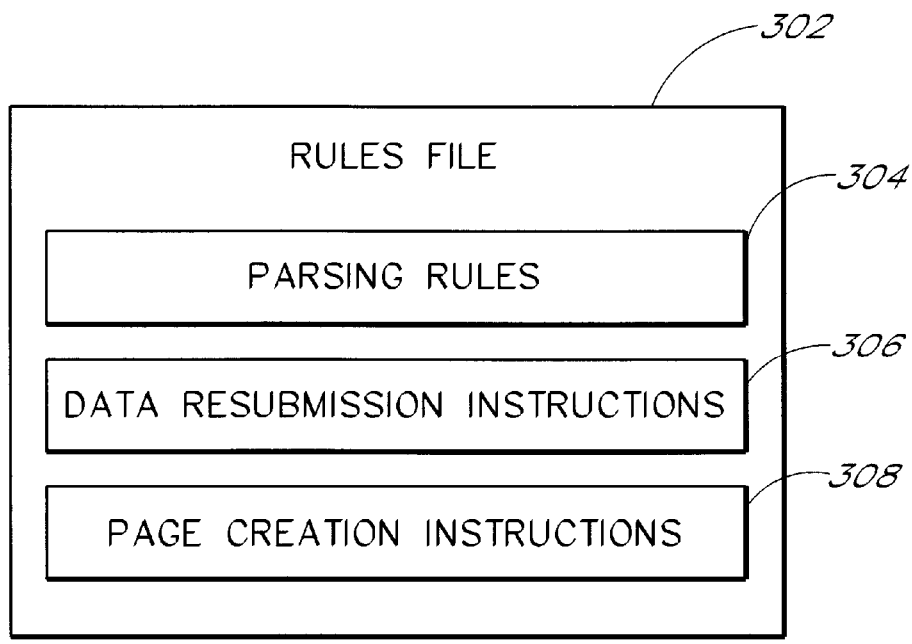
FIG. 3 illustrates the contents of a preferred embodiment of a rules file.

The rules file 124 contains instructions based upon which the processing engine 116 extracts submitted form data from a captured HTTP request and with which the processing engine 116 formulates alternative options for submitting the extracted data to related web sites. As illustrated in FIG. 3, a rules file 302 preferably comprises parsing rules 304 for extracting form data, data resubmission instructions 306 for creating the data resubmission blocks, and any page creation instructions 308 for creating the data resubmission page. In an alternative embodiment, the parsing rules 304, the data resubmission instructions 306 for each data resubmission block, and the page creation instructions 308 can be contained in separate files and individually accessed as necessary by the processing engine 116.

The parsing rules 304 may be in the form of regular expressions that can be used by the processing engine 116 to extract the submitted form data from a captured HTTP request. Alternatively, the parsing rules 304 may be in the form of code or a script that can be run by the processing engine 116 upon the captured HTTP request in order to extract the submitted form data. The parsing rules 304 also specify the expected format of the search or other form submission in question, so that the client program can distinguish such form submissions from other types of HTTP requests. In an alternative embodiment, the parsing rules 304 may specify instructions by which the client program 114 can query the web browser 112 in order to extract the submitted form data directly from the web browser 112 without having to capture an HTTP request.

The data resubmission instructions 306 may be in the form of a formula for each data resubmission block. The processing engine 116 can substitute known values for variables into the formula using the extracted data. Alternatively, the data resubmission instructions 306 may be in the form of code or a script that can be run by the processing engine 116 using the data retrieved using the parsing rules 304.

The data resubmission instructions 306 may also include instructions for transforming extracted form data such that it is in the proper format for the data resubmission block or is properly suited for submission to the related web site. Such transformations may include, for example, a simple transformation of a date in MM/DD/YY format to a date in DD/MM/YY format. On the other hand, the transformations may include more extensive processing such as replacing an extracted word with a synonym for the word that is more suitable for submission to a related web site.

The page creation instructions 308 may include any other code or data necessary to process the extracted data and/or create the data resubmission page. The page creation instructions 308 preferably determine the structure of the data resubmission page and which data resubmission blocks are displayed thereupon. In some cases, the data resubmission blocks to be made available to the user on the data resubmission page may depend upon the data submitted in response to the original form 132A. As illustrated in FIG. 2A, for example, the user has the option of selecting from a number of categories at the Amazon.com web site when performing a search. The page creation instructions 308 are preferably configured to cause the processing engine 116 to display a different set of related searches depending upon the category selected.

The structure of the rules file 124 depends primarily upon the design of the processing engine 116. The processing engine 116 can, in one case, include parsing and form creation engines that interpret structured rules files. In this case, the rules files may be easier to create and may need to include little or no code leading to a more compact rules file 124. On the other hand, a more generic interpreter, such as, for example, a Java interpreter, could be incorporated into the processing engine 116 in order to execute the rules file 124. In this case, the rules files would likely contain code and/or scripts and would likely be much larger and more complicated to create. A generic interpreter, however, may give more flexibility to the functionality of the processing engine 116.

B. Creation of the Rules File

Figure 4:
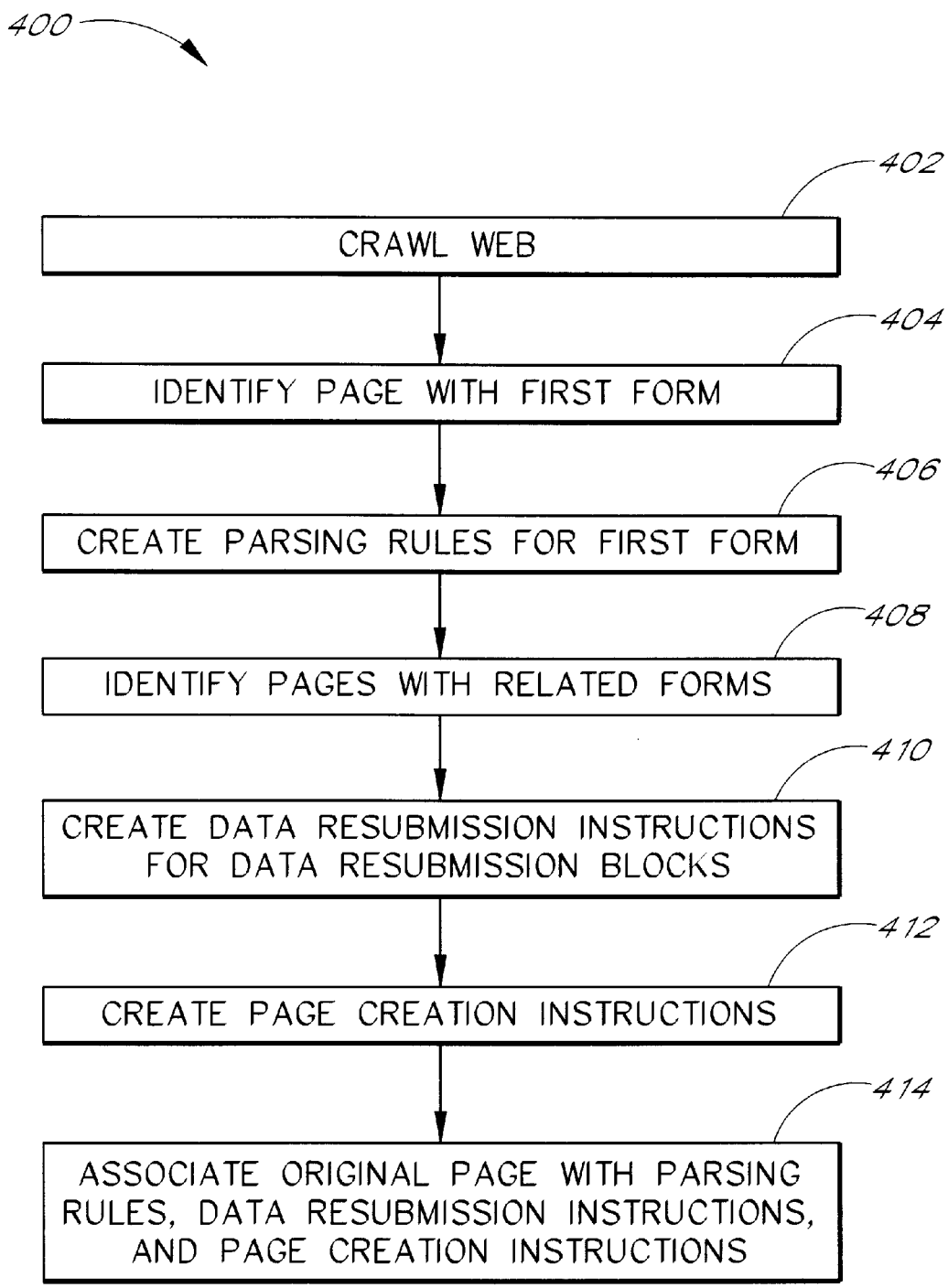
FIG. 4 illustrates a preferred embodiment of a process for creating a rules file.

This subsection describes a preferred embodiment of a process, as illustrated by the flowchart 400 in FIG. 4, for creating a rules file 124. The process can be effected manually, or in the alternative, automated tools can be developed to execute the process.

In a first step 402, the World Wide Web is crawled or searched to identify web pages for which rules files can be created. The search is preferably a manual search starting at more frequently accessed web sites. Certain types of web sites can be targeted during the search, such as Internet merchants. This first step 402 can be skipped if the developer has already identified the web sites of interest. At step 404, a web page is identified that includes a first form. The first form is preferably a query form that allows a search to be performed. The search is preferably a search for a product at a merchant's web site.

At step 406, parsing rules 304 are created for the first form. The structure of an HTTP request generated by a submission of the first form can be easily determined by one skilled in the art by examining the form itself. Once the structure of the expected HTTP request has been determined, a regular expression, code, or a script readable by the processing engine 116 and capable extracting arguments from the HTTP request or from the web browser 112 can be constructed in accordance with techniques well known in the art.

At step 408, pages having related forms are identified. The pages can be identified manually by using Internet search engines to search for web sites providing the same service as that of the first form. The search engine results can then be examined for pages having related forms. Alternatively, step 408 can be skipped if the developer has already identified the related forms of interest.

At step 410, data resubmission instructions 306 that can be executed to create a data resubmission block are created for each of the related forms. The data resubmission instructions 306 are preferably designed to incorporate extracted data into the data resubmission blocks they create. At step 412, page creation instructions 308 are created to formulate a data resubmission page from the data resubmission blocks. The page creation instructions may optionally specify different sets of related sites (and/or different types of searches on such sites) for different category options. For example, as described above, the related product-related searches presented to a user may be dependent upon the product category specified by the user.

At step 414, the original web page identified in step 404 is associated with the parsing rules 304, the data resubmission instructions 306, and the page creation instructions 308. In one embodiment, the parsing rules 304, the data resubmission instructions 306, and the page creation instructions 308 are placed in a single rules file 124 associated with the original web page. In an alternative embodiment, the parsing rules 304 are associated with the original web page and links are provided to the data resubmission instructions 306 and the page creation instructions 308; the rules file 124 can then be created on-the-fly. In still another alternative embodiments, the parsing rules 304 are associated with the destination URL of the CGI program that handles the first form.

IV. Client Side Embodiment

Figure 5B:
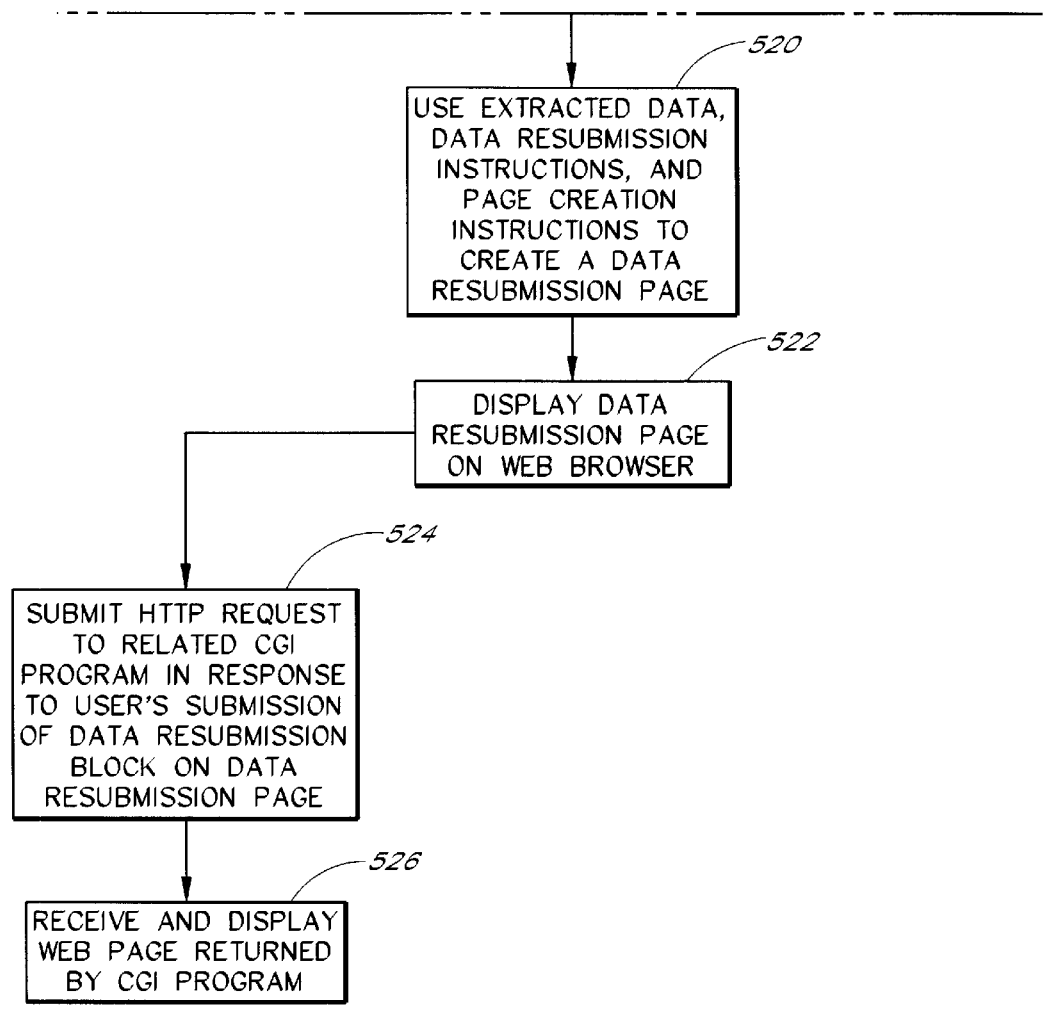

FIGS. 5A–B illustrate a flowchart 500 of a preferred embodiment of a process by which the web browser 112, the client program 114, and the metadata server 120 interact in accordance with a client side embodiment of the present invention. In the client side embodiment, the processing engine is located on the user computer 110 and is preferably a part of the client program 114. At the top of the flowchart 500, the web browser 112 and client program 114 are running on the user computer 110.

At step 502, the client program 114 begins to monitor HTTP requests from the web browser 112. HTTP requests typically include an URL, an HTTP header that contains information related to the HTTP request, and a body that may contain data to be transmitted, such as form data. Also at step 502, the client program 114 begins to relay the URL of each HTTP request to the metadata server 120. At step 504, the web browser 112 requests a first web page, such as the page 131A, which is part of the first web site 130A. The first web page 131A has a first form 132A for which a rules file 124 is available from the metadata server 120. At step 506, the client program 114 sends the URL of the first web page 131A to the metadata server 120. At a next step 508, the metadata server 120 preferably sends metadata, preferably in the form of an HTML page (e.g. 221), about the first web site 130A to the client program 114 for display to the user. Along with the metadata, the metadata server 120 also sends an indication that a rules file 124 is available for the first form 132A. At step 510, the client program 114 requests the rules file 124 for the first form 132A from the metadata server 120. At step 512, the metadata server 120 sends the rules file 124 to the client program 114. The metadata server 120 may alternatively send the rules file 124 to the client program 114 as part of step 508 without the need for a separate request from the client program 508. In one embodiment, the rules file 124 is generated in advance, stored, and sent to the client program 114 in response to the request of step 510. In an alternative embodiment, metadata server 120 creates the rules file 124 on-the-fly at step 512.

At step 514, the user fills out and submits the first form 132A. The web browser 112, in response, generates an HTTP request (GET or POST message) containing the data submitted by the user. The web browser 112 typically URL-encodes the values of the fields of the submitted form 132A and sends the URL encoded data as part of the HTTP request to the first CGI program 134A. In the case the form 132A uses the GET method, the URL encoded data is typically appended to the end of the URL of the CGI program 134A in the HTTP request. In the case the form 132A uses the POST method, the URL encoded data is typically included in the body of the HTTP request to the CGI program 134A.

At step 516, the client program 114, still monitoring the HTTP requests from the web browser 112, captures a copy of the HTTP request generated in step 514. At step 518, the processing engine 116 determines whether the HTTP request contains a submission of the first form, preferably by examining the destination URL of the HTTP request. If the HTTP request does contain a submission of the first form, the processing engine 116 uses the parsing rules 304 to parse the HTTP request and extract the data submitted in response to the first form 132A (hereinafter "extracted data").

In an alternative embodiment, the client program 114, in steps 516 and 518, queries the web browser 112 to determine whether the user has begun to fill out the first form and if so, to determine the values the user has entered into the first form. Accordingly, the client program 114 need not capture the submitted HTTP request in order to extract the form data.

At step 520 the processing engine 116 uses the extracted data, the data resubmission instructions 306, and the page creation instructions 308 to create a data resubmission page. The data resubmission page is preferably formatted in HTML so that it can be displayed within a frame of the web browser 112. The data resubmission page may also include Java code that provides additional functionality to the page. The data resubmission page preferably replaces the metadata page (e.g. FIG. 2A) for the first web site (e.g. 130A) that is supplied by the metadata server 120 to the client program 114 in step 508.

At step 522, the client program 114 displays the data resubmission page on the web browser 112. Since the data resubmission page is preferably formatted in HTML, the web browser 112 is able to display it as it would any other page.

At step 524 the user selects one of the options on the data resubmission page. The web browser 112, in response to the user's selection, submits the data resubmission block selected by the user in an HTTP request. The related CGI program (e.g. 134B) processes the HTTP request and responds with a new web page. At step 526, the web browser 112 receives and displays the new web page returned by the related CGI program.

After step 526, the client program 114 preferably still has a copy of the extracted data. Therefore, the client program 114 can present subsequent options of resubmitting the data to additional related web sites without recapturing the data. In order to present the subsequent options, the client program 114 requests an additional rules file 124 associated with the related web site (e.g. 130B) displayed in step 526. The client program 114 then again follows steps 520–526 of the flowchart 500 to present options for submitting the extracted data to still other related web sites.

A client side embodiment provides a number of advantages over a server side embodiment. First, in a client side embodiment, the client program 114 preferably does not send the HTTP request to the metadata server 120 or to any entity other than the web site to which the first form is submitted. The submitted data is captured on the user computer 110 and remains on the user computer, unless the user decides to resubmit the data to a related web site. Accordingly, the data submitted in response to a first form is kept private between the user and the web sites to which the user specifically chooses to send the data. Second, by processing HTTP requests on the user computer 110, less processing needs to be performed and less data needs to be tracked on the metadata server 120. Accordingly, a less powerful metadata server 120 can be used. Third, the rules file 124 can be made smaller in size than a data resubmission page that would be created and transferred in a server side embodiment. By transferring a smaller file from the metadata server 120 to the client program 114, a substantial time savings can be achieved across lower bandwidth links.

V. Server Side Embodiment

Figure 6:
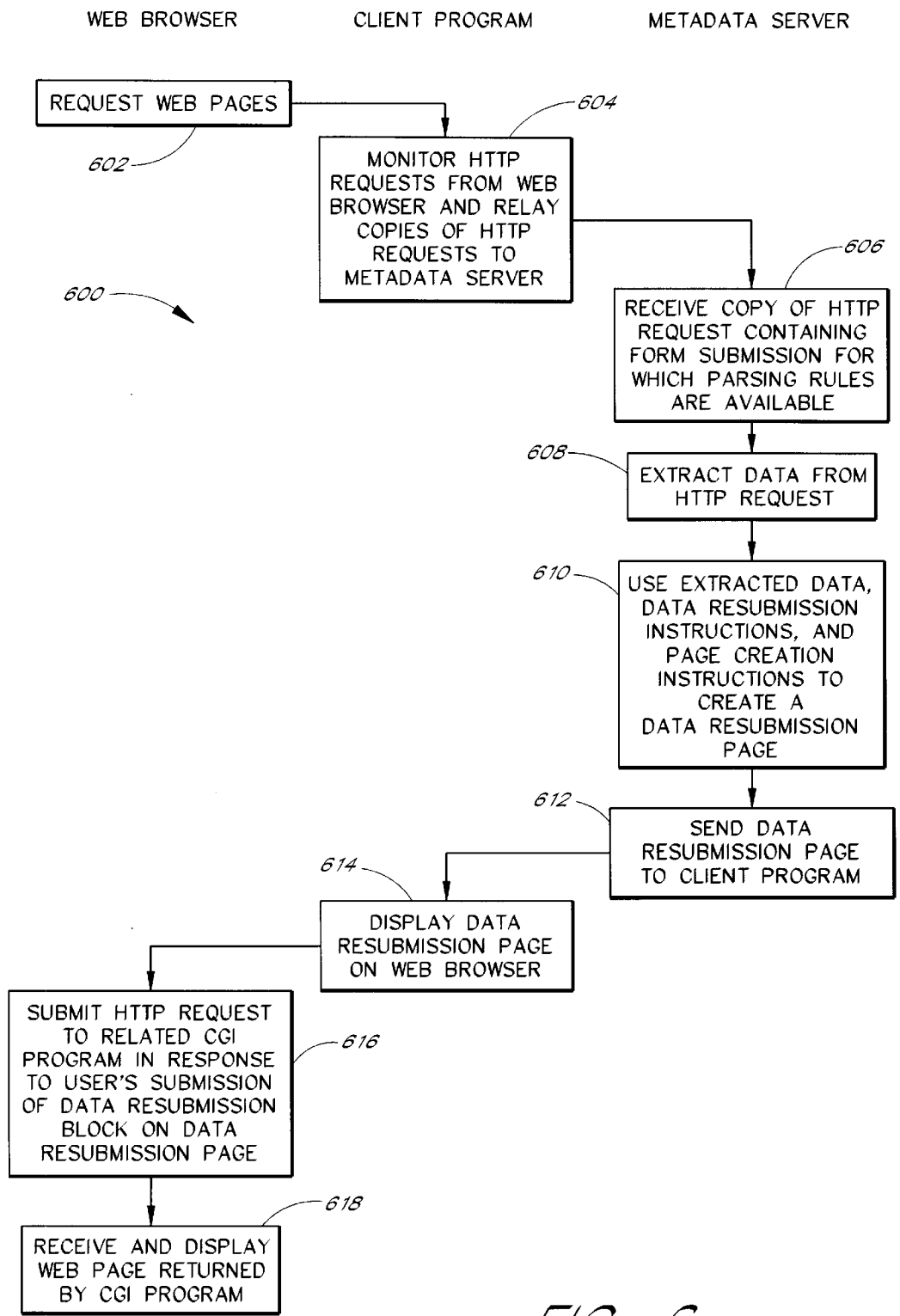
FIG. 6 illustrates a flowchart of a preferred embodiment of a process by which the web browser, the client program, and the metadata server interact in accordance with a server side embodiment of the present invention.

FIG. 6 illustrates a flowchart 600 of a preferred embodiment of a process by which the web browser 112, the client program 114, and the metadata server 120 interact in accordance with a server side embodiment of the present invention. In the server side embodiment, the processing engine 116 is located on the metadata server 120. At the beginning of the flowchart 600, the web browser 112 and client program 114 are running on the user computer 110.

At step 602, the user begins a browsing session and requests web pages through the web browser 112. At step 604 the client program 114 begins to monitor HTTP requests from the web browser 112 and begins to relay copies of the HTTP requests to the metadata server 120.

At step 606, the metadata server 120 receives a copy of an HTTP request resulting from a form submission for which parsing rules 304 are available. At step 608 the processing engine 116 extracts the submitted data from the HTTP request using the parsing rules 304. The parsing rules 304, the data resubmission instructions 306, and the page creation instructions 308 are preferably catalogued in the database 122 according to the URL of the CGI script that processes the form, which is specified in the HTTP request.

At step 610 the processing engine 116 uses the extracted data, the data resubmission instructions 306, and the page creation instructions 308 to create a data resubmission page. At step 612, the metadata server sends the data resubmission page, preferably in place of a page of metadata, to the client program 114. At step 614, the client program 114 displays the data resubmission page on the web browser 112. Since the data resubmission page is preferably formatted in HTML, the web browser 112 is able to display it as it would any other page.

At step 616 the user selects one of the options on the data resubmission page. The web browser 112, in response to the user's selection, submits the data resubmission block selected by the user. The related CGI program (e.g. 134B) processes the HTTP request and responds with a new web page. At step 618, the web browser 112 receives and displays the new web page returned by the related CGI program.

A server side embodiment provides a number of advantages over a client side embodiment. First, existing client programs can be used, without modification, as long as the programs relay copies of HTTP requests to the metadata server 120. A client side embodiment, however, would likely require installing additional functionality to an existing client program or replacing the client program. Second, the capabilities and functionality on the metadata server side could be modified and augmented without replacing the client program. Third, a server side implementation provides more flexibility since there are no functional limitations imposed by a processing engine located on the client program.

In an alternative embodiment, an existing client program 114 that only sends the URL of the HTTP request to the metadata server 120 can be used without modification. This alternative embodiment will function with forms using the GET method, but not the POST method. In forms using the GET method, the submitted data is appended to the end of the URL. In this manner, the form data is transferred to the metadata server 120. In the POST method, however, the form data is included in the body of the HTTP request, which is not sent along to the metadata server 120 in the alternative embodiment.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. A computer-implemented method of assisting a user in locating items sold by merchants, comprising:
   identifying a first merchant web site being browsed by a user;
   capturing, on a client computer of the user, a query entered by the user into a search field of the first merchant web site;
   identifying a second merchant web site that is related to the first merchant web site; and
   presenting to the user an option initiate a search on the second merchant web site using the captured query;
   wherein the method further comprises retrieving from a server a set of instructions for capturing the query and for submitting the query to the second merchant site.

2. The method as in claim 1, wherein the method is performed at least in part by a browser plug-in program.

3. The method as in claim 1, further comprising presenting the user an option to modify the query prior to initiating the search on the second merchant web site.

4. A computer system than embodies the method of claim 1.

5. A system for facilitating the resubmission of submitted form data to related web sites, the system comprising:
   a metadata server configured to store parsing rules and data resubmission instructions;
   a client program configured to execute in conjunction with a web browser on a user computer, the client program further configured to display data resubmission blocks on the web browser; and
   a processing engine configured to capture, using the parsing rules, form data submitted by a user through the web browser, the processing engine further configured to create the data resubmission blocks using the data resubmission instructions.

6. The system of claim 5, wherein the client program is further configured to capture HTTP requests generated by the web browser, and wherein the processing engine is further configured to extract the form data from the captured HTTP requests.

7. The system of claim 6, wherein the processing engine executes on the user computer.

8. The system of claim 7, wherein the processing engine is a part of the client program.

9. The system of claim 6, wherein the processing engine executes on the metadata server.

10. A method of facilitating form submissions to web sites, the method comprising:
   (A) capturing, on a user computer, data submitted by a user in response to a first form located on a first web site, wherein capturing the data comprises (A-1) capturing a first HTTP request generated by a web browser in response to the first form, and (A-2) extracting the data from the captured first HTTP request;
   (B) identifying a second form in response to which the captured data can be submitted, the second form being located on a second web site;
   (C) submitting or presenting to the user an option to submit the captured data to the second web site;
   (D) providing a client program configured to execute in conjunction with the web browser on the user computer, wherein the client program performs (A-1);
   (E) providing a metadata server that communicates with the user computer through a computer network; and
   (F) transmitting, from the metadata server to the client program, a rules file for the first form, wherein the client program uses the rules file to perform (A-2) and (C).

11. The method of claim 10, wherein (C) comprises: (C-1) creating a data resubmission page, and (C-2) displaying the data resubmission page on the web browser.

12. A method of facilitating form submissions to web sites, the method comprising:
(A) capturing, on a user computer, data submitted by a user in response to a first form located on a first web site, wherein capturing the data comprises (A-1) capturing a first HTTP request generated by a web browser in response to the first form, and (A-2) extracting the data from the captured first HTTP request;
(B) identifying a second form in response to which the captured data can be submitted, the second form being located on a second web site;
(C) submitting or presenting to the user an option to submit the captured data to the second web site;
(D) providing a client program configured to execute in conjunction with the web browser on the user computer, wherein the client program performs (A-1);
(E) providing a metadata server that communicates with the user computer through a computer network, wherein the metadata server performs (A-2); and
(F) transmitting, from the client program to the metadata server, the first HTTP request.

13. The method of claim 12, wherein (C) comprises (C-1) the metadata server creating a data resubmission page, (C-2) the client program displaying the data resubmission page on the web browser, and (C-3) transmitting the data resubmission page from the metadata server to the client program.

14. A method of facilitating form submissions to web sites, the method comprising:
(A) capturing, on a user computer, data submitted by a user in response to a first form located on a first web site, wherein the first form uses a GET method for submitting form data, and wherein capturing the data comprises (A-1) capturing a first HTTP request generated by a web browser in response to the first form, and (A-2) extracting the data from the captured first HTTP request by at least: (A-2-i) extracting, on the user computer, the URL, including any appended URL encoded data, from the first HTTP request, (A-2-ii) transmitting the extracted URL from the client program to the metadata server, and (A-2-iii) extracting, from the extracted URL, the data submitted by the user in response to the first form;
(B) identifying a second form in response to which the captured data can be submitted, the second form being located on a second web site;
(C) submitting or presenting to the user an option to submit the captured data to the second web site by at least (C-1) creating a data resubmission page, (C-2) displaying the data resubmission page on the web browser, and (C-3) transmitting the data resubmission page from the metadata server to the client program;
(D) providing a client program configured to execute in conjunction with the web browser on the user computer, wherein the client program performs (A-1), (A-2-i), (A-2-ii), and (C-2); and
(E) providing a metadata server that communicates with the user computer through a computer network, wherein the metadata server performs (A-2-iii) and (C-1).

15. A method of facilitating form submissions to web sites, the method comprising:
(A) capturing, on a user computer, data submitted by a user in response to a first form located on a first web site, wherein capturing the data comprises (A-1) capturing a first HTTP request generated by a web browser in response to the first form, and (A-2) extracting the data from the captured first HTTP request;
(B) identifying a second form in response to which the captured data can be submitted, the second form being located on a second web site;
(C) submitting or presenting to the user an option to submit the captured data to the second web site by at least (C-1) creating a data resubmission block for the second form, the data resubmission block having the same destination URL as the second form, the data resubmission block incorporating the captured data, and (C-2) displaying the data resubmission block on the web browser;
(D) providing a client program configured to execute in conjunction with the web browser on the user computer, wherein the client program performs (A-1);
(E) providing a metadata server that communicates with the user computer through a computer network; and
(F) transmitting, from the metadata server to the client program, a rules file for the first form, wherein the client program uses the rules file to perform (A-2) and (C).

16. A method of facilitating form submissions to web sites, the method comprising:
(A) capturing, on a user computer, data submitted by a user in response to a first form located on a first web site, wherein capturing the data comprises (A-1) capturing a first HTTP request generated by a web browser in response to the first form, and (A-2) extracting the data from the captured first HTTP request;
(B) identifying a second form in response to which the captured data can be submitted, the second form being located on a second web site;
(C) submitting or presenting to the user an option to submit the captured data to the second web site by at least (C-1) creating a data resubmission block for the second form, the data resubmission block having the same destination URL as the second form, the data resubmission block incorporating the captured data, and (C-2) displaying the data resubmission block on the web browser;
(D) providing a client program configured to execute in conjunction with the web browser on the user computer, wherein the client program performs (A-1) and (C-2);
(E) providing a metadata server that communicates with the user computer through a computer network, wherein the metadata server performs (A-2) and (C-1); and
(F) transmitting, from the client program to the metadata server, the first HTTP request;
wherein (C) further comprises (C-3) transmitting the data resubmission block from the metadata server to the client program.

* * * * *